Nov. 22, 1955 L. E. CISNE 2,724,216

METHOD OF FABRICATING ELECTRODE SPACERS

Filed June 22, 1950 2 Sheets-Sheet 1

INVENTOR
L. E. CISNE
BY
ATTORNEY

Nov. 22, 1955 L. E. CISNE 2,724,216
METHOD OF FABRICATING ELECTRODE SPACERS
Filed June 22, 1950 2 Sheets-Sheet 2
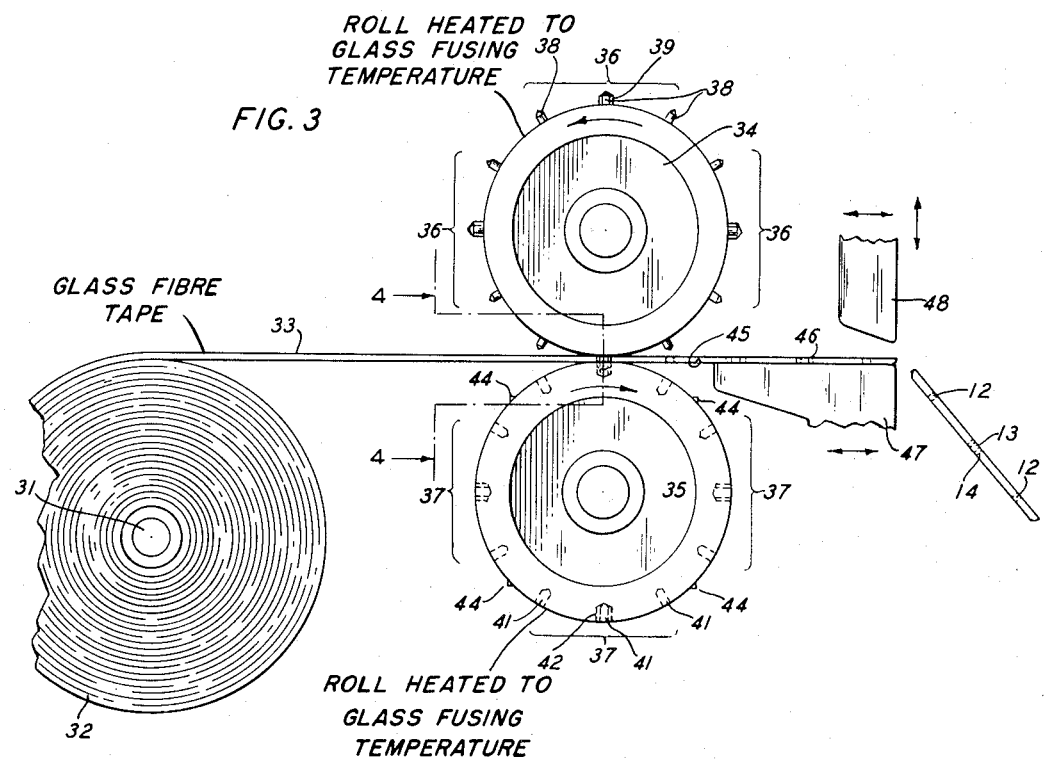
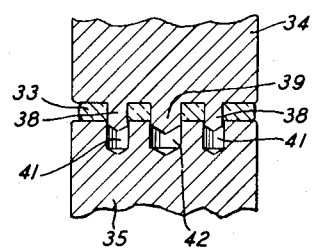
INVENTOR
L. E. CISNE
BY
ATTORNEY

2,724,216
METHOD OF FABRICATING ELECTRODE SPACERS

Luther E. Cisne, New Providence, N. J., assignor to Bell Telephone Laboratories, Incorporated, New York, N. Y., a corporation of New York Application June 22, 1950, Serial No. 171,112

3 Claims. (Cl. 49—79)

This invention relates to insulator spacers and supports and more particularly to methods of fabricating such spacers for electron discharge devices.

Mica is presently employed widely as the interelectrode insulating material for electron discharge devices. The mica so used, which is found in nature, has to be carefully selected and screened and is available for incorporation into electron discharge devices only in sheets of practically perfect planarity. The thickness of these sheets is controlled by splitting the mica lengthwise along its laminations. It may then be punched and sheared to its lateral dimensions for incorporation into electron discharge devices.

Because of its laminated structure, mica has a high transverse shear strength but a much lower longitudinal shear strength. This ratio in shear strengths limits the closeness and the smallness of punching or apertures that may be made in the mica. The proximity of two adjacent apertures is limited because adjacent transverse shearing lines tend to cause a delamination, that is, a shearing along the length of the planar mica sheet causing the laminations to separate from each other. At the same time, the high transverse shearing strength places a limitation on the minimum diameter of a punched aperture realizable with a given thickness of the mica sheet.

Furthermore, the finely powdered products from the mica shear are highly abrasive. Because in commercial practice a large number of parts are expected to be processed before maintenance and retooling of the punch, this places a practical limit on the tolerance that can be specified for a given aperture. Thus, while the punch and die clearance can be accurately determined for a given single aperture, in practice the abrasive effect of the powdered mica requires a relatively large clearance and therefore a high dimensional tolerance or eccentricity.

In exceedingly small miniature and subminiature electron discharge devices, these dimensional limitations inherent in the use of mica have placed minima on the closeness of the spacing of the electrode supports and the interelectrode spacings. Thus, the dimensional limitations of the mica and of practical mica fabrication techniques enforce on the design of electron discharge devices irreducible minimum aperture diameters and interaperture spacings. These factors, together with the individual electrode structures, ultimately determine the minimum possible interelectrode spacings. However, as the effectiveness of grid control in electron discharge devices is directly related to the spacing between the grid and emitter electrodes and also the anode voltage at which the device will operate is directly related to the spacing between the anode and emitter electrodes, it is desirable to be able to reduce these interelectrode spacings below that attainable with mica insulators and supports in order to obtain efficient miniature and subminiature electron discharge devices which will operate at low anode voltages.

In such devices, mica spacers introduce another limiting factor that inhibits the attainment of small dimensions and spacings or the employment of designs incorporating such small spacings. By its very structural nature mica exists in only one form and shape which is susceptible to only very limited modification and in particular mica is limited to two dimensional planar members. In certain designs of very minute electron discharge devices the interelectrode spacing could be reduced by altering the insulator support out of a planar configuration and into a three-dimensional structure; mica is not susceptible to such a change.

While the general characteristics of the mica as an insulating material for electron discharge devices are good, with respect particularly to its relatively high dielectric strength and high resistivity, it has one other inherent characteristic which must be compensated or planned for in the design and fabrication of electron discharge devices. This is that mica may suffer a delamination when raised to temperatures well below the 800° C. to which electrodes and electron discharge devices are commonly raised during an out-gassing treatment. During this delamination copious quantities of a gas are liberated, being apparently the water of crystallization. This results in an increase in thickness and a general loss of strength in the mica together with an impairment of the cathode activity. This effect and its deleterious results are generally avoided in electron discharge device designs by limiting the area of contact between the heated electrode members and the associated mica parts.

Glass is an insulating material that is satisfactory for employment in evacuated systems, such as electron discharge devices, from the standpoint of its chemical and thermal stability and its electrical characteristics. It has thus been employed in electron discharge and lamp devices. However, a considerable amount of heat is required to fuse glass and problems have arisen in attempting to fuse the glass in place in the device without having the heat employed effect the eelctrode and other metal parts. When minute and closely spaced electrodes are employed, further difficulties arise in attempting to attain accurate dimensions with glass insulators that have to be molten or fused in the vicinity of the electrodes.

It is an object of this invention to enable and improve the fabrication of insulator spacers from vitreous material, such as glass, the spacers being provided with accurately dimensioned apertures for the positioning of electrodes and electrode supports. Thus, it is an object of this invention to completely fabricate such insulator spacers prior to their incorporation into the electron discharge device so that there need be no heating of the vitreous material in the vicinity of the electrode or fusion of this material to the electrodes.

It is another object of this invention to attain close interelectrode spacing by the removal of the limitations introduced in electron discharge device design by the insulator supports.

It is a further object of this invention to fabricate insulator supports for electron discharge devices with any desired configuration of apertures, and in complex configurations not limited to a two-dimensional planar form. Thus, it is an object of this invention to remove from the design of electron discharge devices, and particularly with respect to such devices of very minute dimension, various limitations inherent in the particular nature of mica or in fused glass insulators.

It is a still further object of this invention to provide a method of fabricating insulator supports for electron discharge device by a continuous process in which any desired size aperture, number of apertures, or variations from a planar form may be attained.

These and other objects of this invention are realized in one specific embodiment of this invention by the fabrication of insulating spacers and supports for electron discharge devices from vitreous materials, such as glass, which have been prepared in the form of very fine continuous filaments or fibers manufactured into a yarn capable of being processed into textile forms. Particularly a glass fiber tape wound from such yarn is employed, the apertures desired in the insulating spacer being formed by pressing needles or spikes through the tape. The exact size of the aperture may be determined by the size needle employed and the proximity of two such apertures is not limited by the thickness of the vitreous material. The fibrous glass tape impaled on these needles is then heated and pressed into any desired configuration whereby the fibers of the vitreous tape fuse together rendering the tape rigid but preserving the exact positioning and dimensions of the apertures formed by the needles or spikes, which are then withdrawn from the insulator. The insulator thus fabricated may be employed in electron discharge devices and the electron discharge devices may be designed with closer interelectrode spacings and smaller electrode or electrode support members extending through the insulator spacer or support as the various inhibitions introduced by the mica, as explained above, have been removed.

It is thus one feature of this invention that an insulator spacer or support for electron discharge devices be fabricated by fusing together the fibers of a vitreous fiber tape. Because of the initial pliability and flexibility of the tape the fusing members which apply the heat and pressure to the tape may be of various shapes and thus impart to the fused and rigid insulator any desired configuration. Further, because the fibers of the vitreous material are capable of being woven into tapes of various thicknesses the thickness of the rigid insulator may be priorly and accurately determined.

It is a further feature of this invention that the insulator described above be fabricated by impaling the vitreous fiber tape onto spikes or needles which pierce the fibrous tape and provide accurately dimensioned apertures following the heat treatment of the tape in a confining mechanical arrangement wherein the fibers fuse together preserving the exact shape and dimensions of the apertures. Apertures of various shapes and sizes may be obtained depending on the form of the needle or spike employed. Since the vitreous fiber tape may be bent, folded, or locally deformed into almost any shape and since the apertures may be formed in almost any size and shape in the tape at any position thereof, a vast number of possibilities are provided for rigid insulator supports for electron discharge devices, as the rigid tape preserves the exact dimensions of the bends, folds, embossings, apertures, etc., with which the tape may be impressed.

It is a further feature of this invention that insulating spacers and supports may be fabricated in accordance with this invention by a continuous method in which the fibrous glass or vitreous tape is wound on a feed reel and fed between two heated rollers having mating spikes and apertures thereon which form, pierce, and fuse the tape into the desired insulating spacer or support member. Shearing means for separating the rigid insulators are then provided.

A complete understanding of this invention and of the various features thereof may be gained from consideration of the following detailed description and accompanying drawing, in which:

Fig. 3 is a representation of another apparatus for fabricating the insultor spacers employed in the device of Fig. 1; and Fig. 4 is a sectional view along the line 4—4 of Fig. 3.

Figure 1:
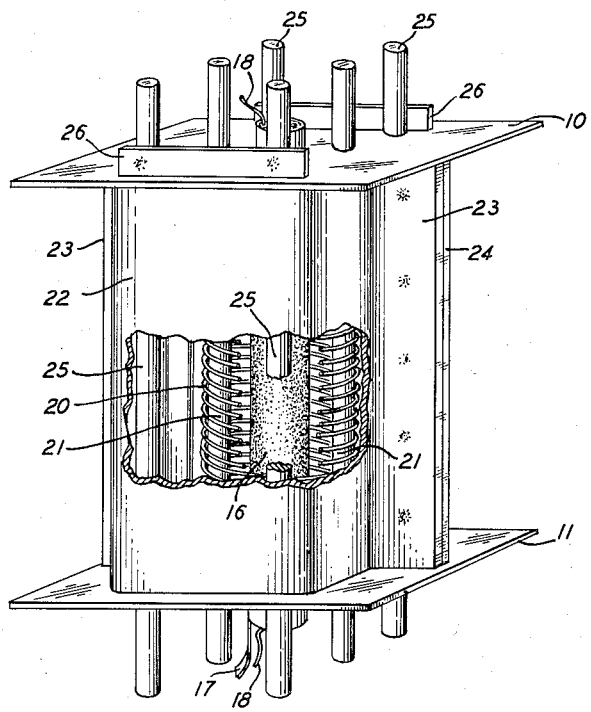
Fig. 1 is a perspective view of an electron discharge device electrode unit of a generally conventional nature employing insulator spacers fabricated in accordance with this invention, portions of some of the elements being broken away to show other members more clearly.
Figure 2:
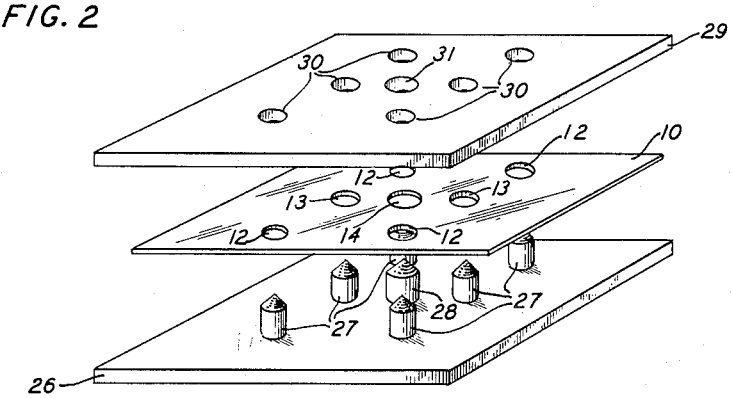
Fig. 2 is an exploded perspective view of one apparatus for fabricating the insulator spacers employed in the device of Fig. 1, the spacer being shown following such fabrication.

Referring now to Fig. 1, there is shown an electrode unit for incorporation into an electron discharge device, the unit employing planar insulating spacers of the general form priorly employed in conventional units with mica insulators. It is to be understood, however, that insulator spacers fabricated in accordance with this invention need not be planar; instead they particularly lend themselves to incorporation into non-conventional designs of electron discharge devices. Thus such spacers may be U-shaped and surround an edge of a planar electrode or have a planar section with positioned apertures therein and bent or curved side portions. The mount illustrated in Fig. 1, however, employs two planar end insulators 10 and 11 each having a plurality of apertures 12 and 13 therethrough in two parallel rows and a central aperture 14 therethrough between the two rows, as best seen in Fig. 2. A cylindrical cathode 16 extends through the apertures 14 and is positioned by them, the cathode having an electron emissive coating thereon as is known in the art and a cathode tab 17 extending from one end of the cathode surface. A heater element 18 extends through the cylindrical cathode 16, only the end leads of the heater element being visible in Fig. 1.

A helical wound grid 20 encompasses the cathode 16 and and is supported by two side rods 21 which extend through the apertures 13 in the end spacers 10 and 11 and are positioned thereby. A two-part anode 22 having flange sections 23 and 24 welded together encompasses the grid 20. The anode 22 is positioned by four anode support rods 25 which extend through and are in turn positioned by the apertures 12 in the end insulator spacers 10 and 11. Anode support rod retaining tabs 26 may be secured to the support rods 25 on the outer side of the spacers 10 and 11, as by being welded thereto, to lock the whole unit together.

The end insulator spacer members 10 and 11, which have been shown as simple planar members but which are not restricted to that shape as are mica insulators, may be fabricated by the apparatus or fixture shown in Fig. 2, which comprises a bottom member 26 having needles 27 thereon in two parallel rows and a slightly larger needle 28 positioned between the two rows, and an upper member 29 having apertures 30 therethrough mating with the needles 27 and a central aperture 31 mating with the needle 28.

The woven vitreous or glass tape is stretched and forced onto the needles 27 and 28 of the lower member 26. The upper member 29 is then placed on top of the tape and heat applied to fuse the fibers of the tape together into the rigid insulator 10, the apertures 12, 13 and 14 being formed by the needles 27 and 28 and retaining their exact dimensions when the fibers are fused together. The size and position of the needles 27 and 28 on the lower member 26 may of course be varied so that any desired grouping of apertures and any desired shape and size of such apertures are attainable.

In one specific illustrative embodiment of this invention, there is employed a vitreous woven tape known as "Fiberglas" and which is made available commercially by the Owen-Corning Fiberglas Corporation of Toledo, Ohio. The individual fibers in the tape are made of "Pyrex" glass in four sizes from 0.00023 inch to 0.00038 inch diameter and covered with a lubricant which may be removed with a solvent during the processing. The woven tape may have a loose or tight weave and is presently available commercially in thicknesses from 0.003 inch to 0.015 inch and in widths of from three-eighth inch to one and one-half inch; these dimensions are to be considered only as being exemplary of the presently available commercial tapes and in on way to limit the scope of this invention as the principles of this invention are not dependent on the dimensions of the vitreous tape employed. In the particular embodiment illustrated as incorporated in the electrode unit of Fig. 1 a tight weave Fiberglas tape one-half inch in width and .007 inch thick was fabricated into the insulator spacers 10 and 11.

The fixture comprising the upper and lower members 29 and 26 may be of any metal to which the vitreous tape will not readily adhere. Thus in the fabrication of the insulators 10 and 11 the members 26 and 29 may advantageously be of oxidized stainless steel. In one particular embodiment of this invention the one-half inch wide, .007 inch thick tight weave Fiberglas tape was impressed on the needles 27 and 28 of an oxidized stainless steel member 26 and, with the upper member 29 in position, placed in a furnace. An inert atmosphere was present in the furnace during the processing. The tape may be heated to temperatures ranging from approximately 800° C. to 900° C. to fuse the individual fibers into a rigid insulator. A temperature of 850° C. has been found to be advantageous for the fabrication of insulators which are stiff but not overly brittle. Thus in the one specific embodiment using the tape referred to above, the fixture was heated to 850° C. for approximately fifteen minutes. It is to be realized, of course, that the particular material of the fixture, i. e., of the lower and upper members 26 and 29, and the processing atmosphere are not critical for the fabrication of insulators in accordance with this invention but that the time and temperature required to properly fuse the fibers of a given thickness tape will be dependent on them as well as on the tape.

As mentioned before, the fused insulator spacer need not be a planar member but may have other shapes in which case the fixture would have the necessary configuration to form the flexible tape into that shape. As glass and other vitreous materials may be heated to high temperatures without loss of strength and the liberation of gas, as in the case of mica, fused insulator spacers fabricated in accordance with this invention may have configurations that enable them to be in intimate contact with the electrodes or electrode supporting members without the deleterious effects that would result from such a design if it were attempted with mica insulators. However, in addition to this dimensional freedom that insulators thus fabricated have, which planar mica insulators do not, insulators fabricated in accordance with this invention allow closer interelectrode spacings because of the reductions permissible in the distances between apertures in the insulator and in the sizes of the apertures themselves. In the electrode unit of Fig. 1, the spacings between the electrodes in the past have been limited by the distances between the rods 21 and 25 and the cathode 16 because of the limitations imposed by the mica insulator as to the minimum distances that may exist between the apertures 30 themselves and aperture 31 in the two end spacers. With mica insulators this limit in interaperture spacing is about five times the thickness; if closer spacings are attempted the mica between the apertures will be delaminated. Therefore, the interelectrode spacings can not be smaller than this limit imposed by the supporting means. However, with insulator spacers fabricated in accordance with this invention, the proximity of two adjacent apertures is limited only by the diameters of a few intervening glass, or other vitreous, fibers which are fused together between the two apertures. The width of a few fibers is of course far less than five times the thickness of the insulator spacer.

It is further to be realized that with a vitreous fiber tape the dimensions and shape of a given aperture are limited on the minimum side only by the dimensions and shape of the puncturing needle in the heat-treating fixture which has itself no mechanical requirement except self-support. With mica insulators however the minimum aperture diameter is again about five times the thickness of the insulator.

A further feature of this invention is that, unlike the prior mica insulators which are produced by hand-fed punch operations, fused fibers tape insulators may be fabricated in accordance with this invention in a relatively inexpensive continuous process, such as is illustrated in Fig. 3. Referring now to that figure, there is shown a spool 31 on which is wound a reel of a vitreous fiber tape 32, such as Fiberglas, the end 33 of which passes between two heated rollers 34 and 35. Roller 34 is provided with four sets of pins 36, each set comprising three rows of pins. The first row comprises two pins 38, the second the two pins 38 and an intermediate larger pin 39, as shown in Fig. 4, and the third row the two pins 38. These pins mate with four sets of apertures 37 in the periphery of the roller 35, each set 37 comprising six small apertures 41 which mate with the pins 38 and one larger aperture 42, which mates with the pin 39. As is apparent, the rollers have mating pins and apertures so arranged to fabricate the insulator spacers 10 and 11 employed in the illustrative electrode unit of Fig. 1, four such insulators being fabricated for each turn of the rollers.

The rollers are both driven to feed the tape 33 between them. As the tape 33 is fed between the heated rollers the pins 38 and 39 pierce the tape to form the desired apertures, such as the apertures 12, 13, and 14, and almost simultaneously with the piercing the rollers fuse the fibers together. An embossing member 44 on the lower forming roller 35 puts a wedge-shaped impression 45 on the lower side of the fused rigid tape 46. This impression 45 extends across the width of the tape 46. The tape 46 is picked up by a follower anvil 47 on the other side of the rollers 34 and 35 which carries it under a follower breaking tool 48 which hits the tape 46 just above the impression 45 and separates the insulator 10 from the fused tape portion 46.

It is to be understood that the periphery of the forming rollers 34 and 35 may have other arrangements of pins, wedges, curved portions, and apertures for the fabrication of insulator spacers to be incorporated in electron discharge devices of other designs than that illustrated by the electrode unit of Fig. 1.

It is to be understood that the above-described embodiments are merely illustrative of the application of the principles of this invention and are not to be considered as restricting it to the form or shape of insulator spacer illustrated. Numerous other arrangements may be devised by those skilled in the art without department from the spirit and scope of the invention.

What is claimed is:

1. The method of fabricating rigid insulating spacers having a plurality of apertures therein comprising continuously feeding a flexible glass fiber tape between a pair of surfaces heated to the fusion temperature of glass, cyclically impaling successive portions of the tape upon aperture forming projections on one of said surfaces, fusing each of said portions while impaled upon said projections, forming spaced transverse impressions in said tape while in the fuse state, rigidifying the apertured impressed tape by driving the tape beyond the heated surfaces, and separating the rigid tape into individual insulating spacers by striking the transverse impressions in the tape.

2. The method of fabricating rigid insulating spacers including a plurality of apertures therein comprising continuously feeding a flexible glass fiber tape between a pair of rollers heated to the fusion temperature of glass, cyclically impaling successive portions of said flexible tape upon aperture forming means on said rollers, fusing the tape while impaled upon said aperture forming means, forming a transverse impression in the surface of said tape between said successive portions of the tape, driving the apertured fused tape beyond said rollers whereupon the tape rigidifies upon cooling, and severing the rigidified tape into individual insulating spacers by striking a blow at the impressed portions.

3. The method in accordance with claim 2 wherein the tape in a fused state is driven beyond the rollers by the aperture forming means over planar follower means whereupon the tape is rigidified in planar form upon cooling.

References Cited in the file of this patent

UNITED STATES PATENTS

| | | |
|---|---|---|
| 1,815,146 | Erber | July 21, 1931 |
| 1,922,673 | Filippo | Aug. 15, 1933 |
| 1,951,612 | Hunter | Mar. 20, 1934 |
| 2,204,288 | Wilkoff | June 11, 1940 |
| 2,213,797 | Claussner | Sept. 3, 1940 |
| 2,224,484 | Morrow | Dec. 10, 1940 |
| 2,271,829 | Powers | Feb. 3, 1942 |
| 2,289,339 | Brennen | July 14, 1942 |
| 2,344,601 | Collins | Mar. 21, 1944 |
| 2,443,617 | Homan | June 22, 1948 |
| 2,550,893 | Weisbecker | May 1, 1951 |
| 2,561,520 | Lemmens et al. | July 24, 1951 |